(12) United States Patent
Martinez et al.

(10) Patent No.: US 6,227,570 B1
(45) Date of Patent: May 8, 2001

(54) STABILIZER FLIP PAD ASSEMBLY FLIP-OVER RESTRAINT

(75) Inventors: David V. Martinez, Fort Madison; William E. Little; Robert E. Mozingo, both of Burlington, all of IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/434,664

(22) Filed: Nov. 5, 1999

(51) Int. Cl.[7] ........................................... B60S 9/02
(52) U.S. Cl. ............................... 280/764.1; 212/304
(58) Field of Search ........................... 280/763.1, 764.1, 280/765.1, 766.1, 43.14; 212/301, 304

(56) References Cited

U.S. PATENT DOCUMENTS

| | | |
|---|---|---|
| 3,642,242 | 2/1972 | Danekas . |
| 3,913,942 | * 10/1975 | MacKenzie et al. ............ 280/763.1 |
| 4,023,828 | * 5/1977 | MacKenzie et al. ............ 280/763.1 |
| 4,546,996 | * 10/1985 | Hanson ............................. 280/764.1 |
| 4,889,362 | 12/1989 | Lagsdin . |
| 5,050,904 | * 9/1991 | Lagsdin ............................. 280/764.1 |
| 5,051,057 | 9/1991 | Kremer . |
| 5,054,812 | * 10/1991 | Lagsdin ............................. 280/764.1 |
| 5,466,004 | 11/1995 | Lagsdin . |
| 5,547,220 | 8/1996 | Lagsdin . |
| 5,667,245 | * 9/1997 | Lagsdin ............................. 280/763.1 |
| 5,957,496 | * 9/1999 | Lagsdin ............................. 280/763.1 |
| 5,992,883 | * 11/1999 | Lagsdin ............................. 280/763.1 |

OTHER PUBLICATIONS

Schematic—"Pad with Flip–Over" by Stoughton Steel Co., Inc.

* cited by examiner

Primary Examiner—Brian L. Johnson
Assistant Examiner—Bryan Fischmann
(74) Attorney, Agent, or Firm—Foley & Lardner

(57) ABSTRACT

An apparatus and method is disclosed for limiting rotation of a stabilizer flip pad assembly in a support assembly for a work vehicle to prevent undesired flipping of the stabilizer flip pad assembly, where the support assembly includes a support leg assembly and the stabilizer flip pad assembly, and the stabilizer flip pad assembly is rotatably attached to the support leg assembly. The apparatus includes a locking pin assembly and a restraint arm supported by the support leg assembly, where the restraint arm is rotatable at a rotation axis proximate a first end of the restraint arm. The restraint arm includes a slot configured to receive a locking pin of the locking pin assembly, and a restraint protrusion proximate a second end of the restraint arm and extending perpendicular to a plane of rotation of the restraint arm. The restraint protrusion limits rotation of the stabilizer flip pad assembly when the restraint arm is in an extended position, and allows rotation of the stabilizer flip pad assembly past the restraint protrusion when the restraint arm is in a retracted position.

21 Claims, 7 Drawing Sheets

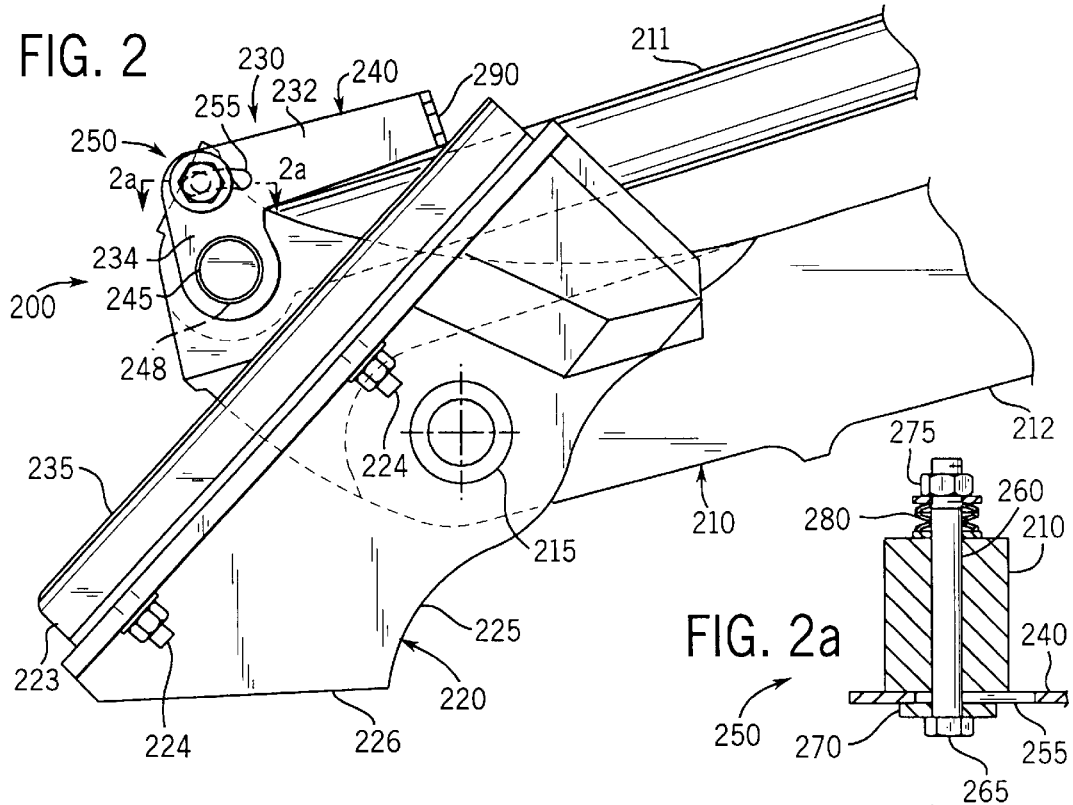
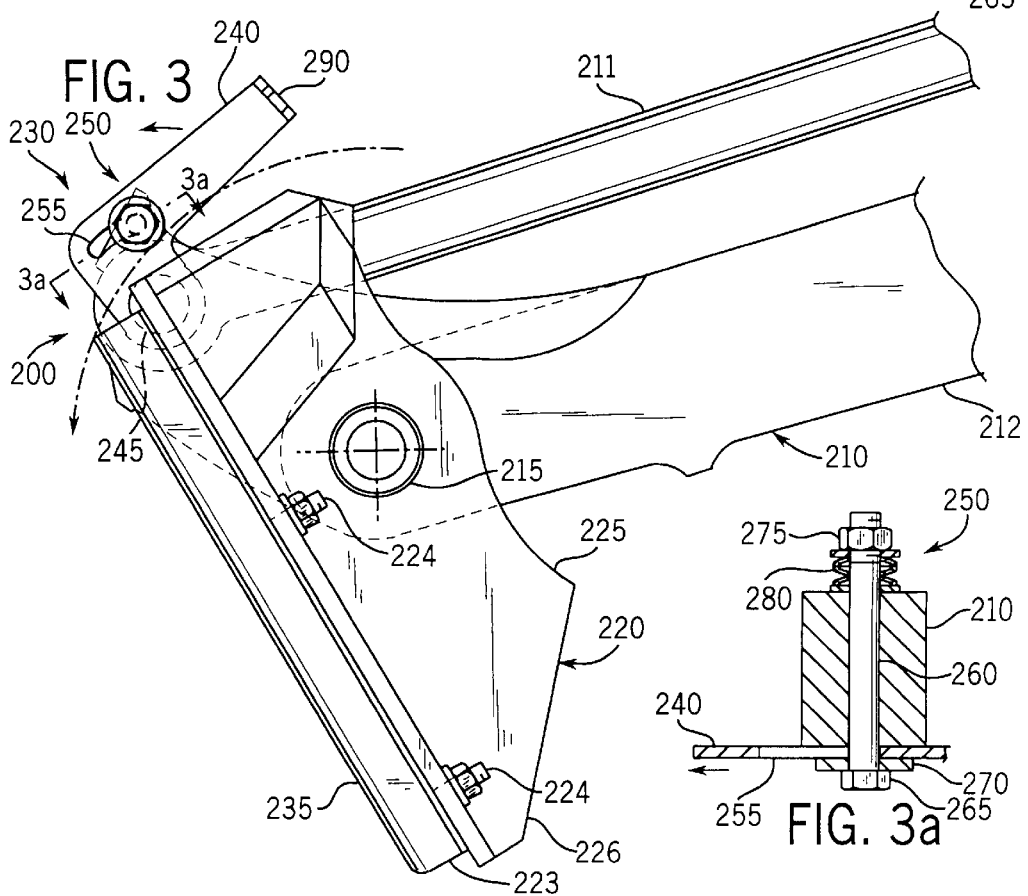

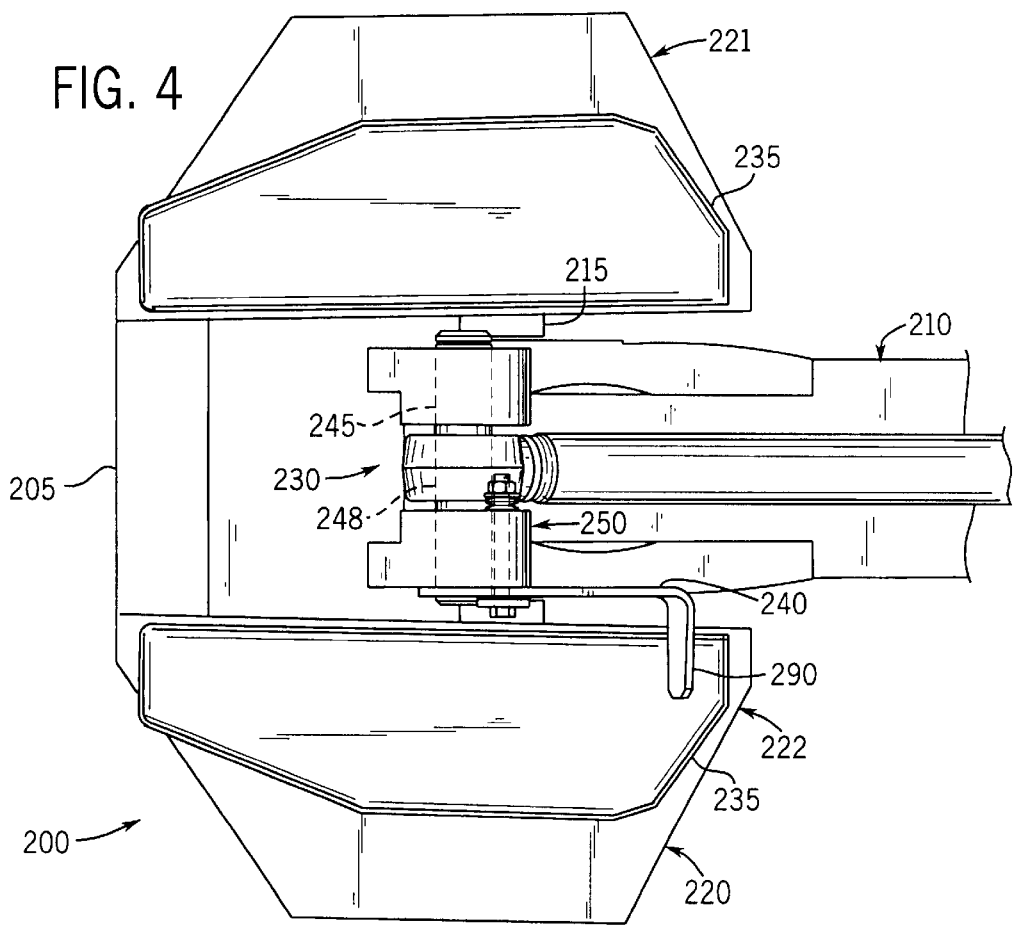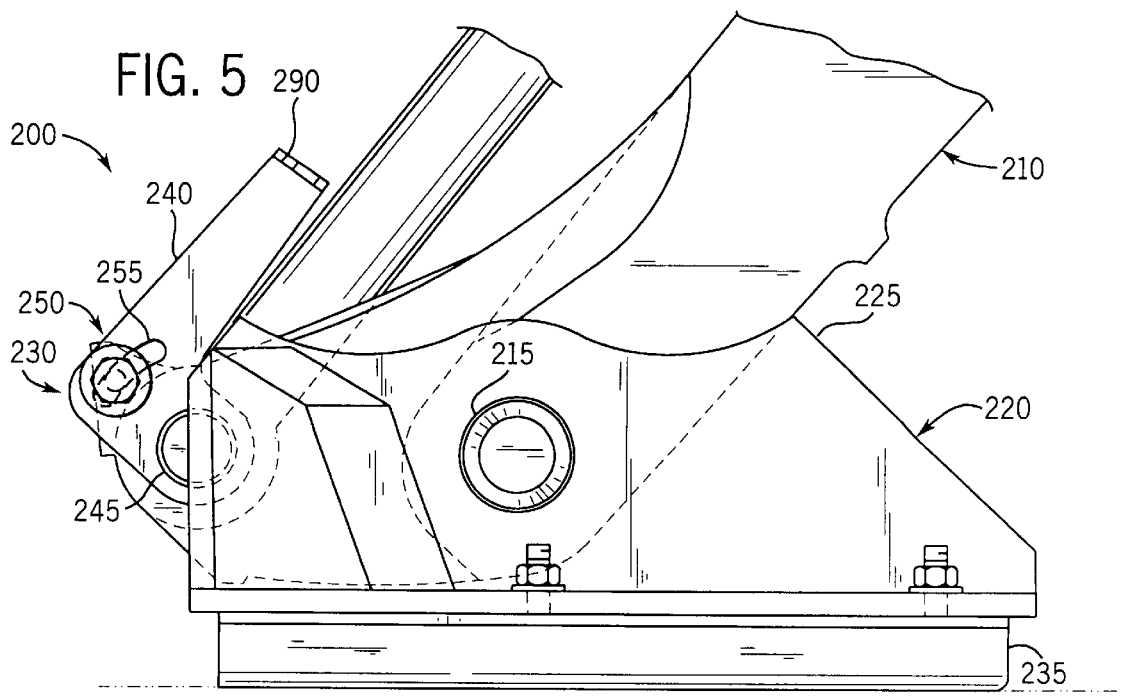

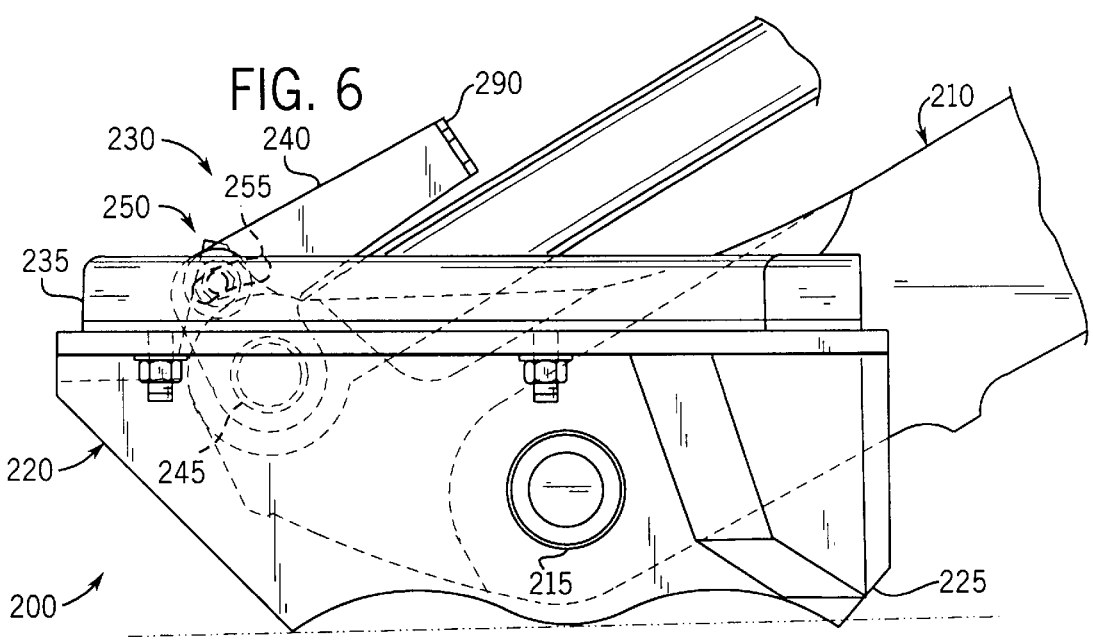
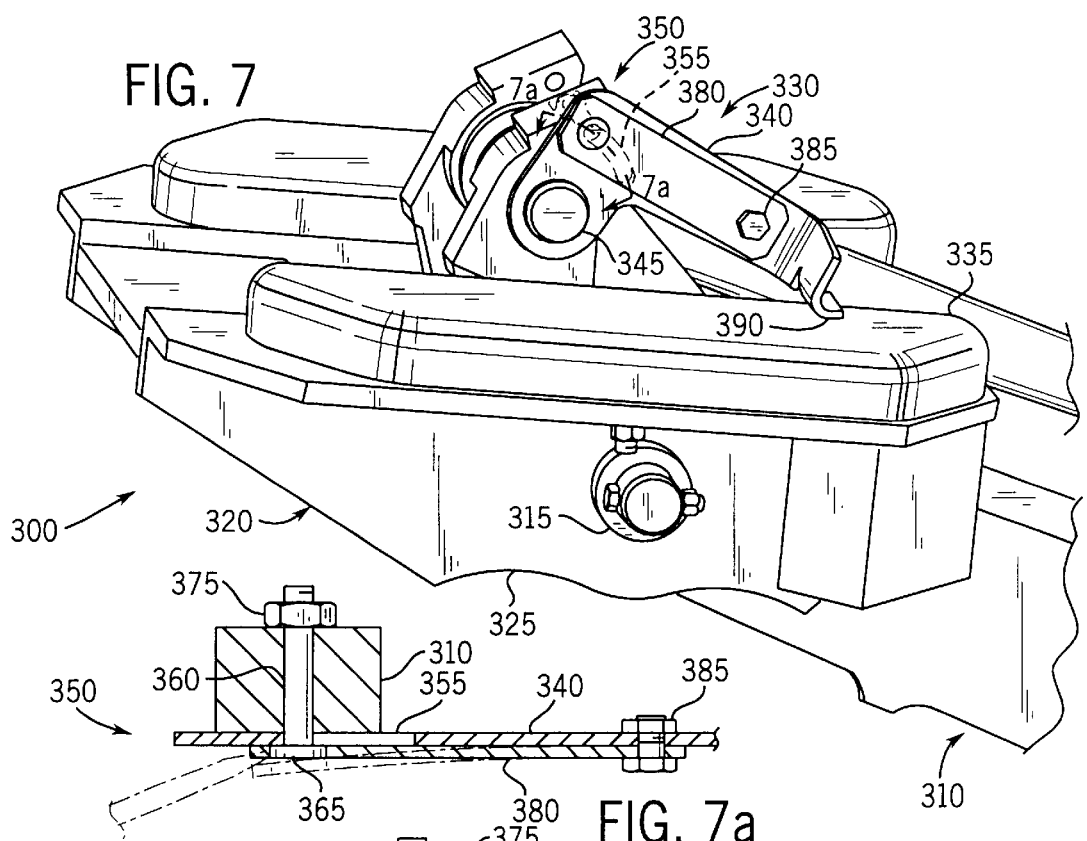
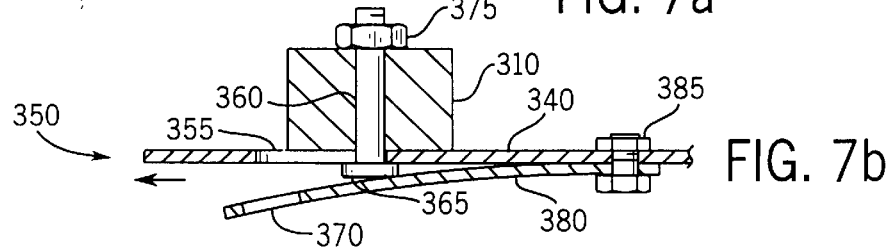

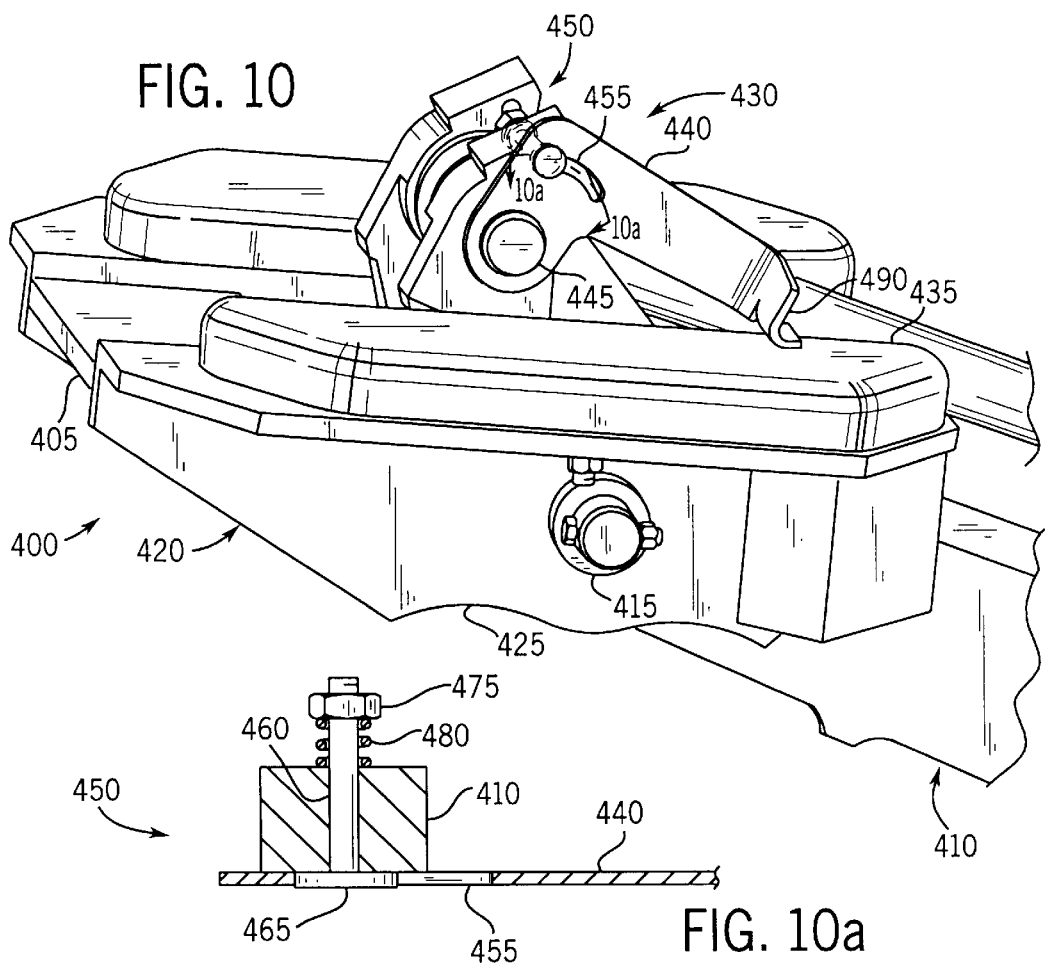
FIG. 10
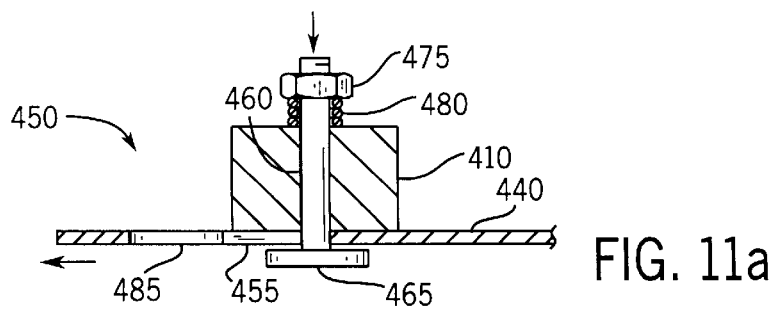
FIG. 10a
FIG. 10b
FIG. 11a

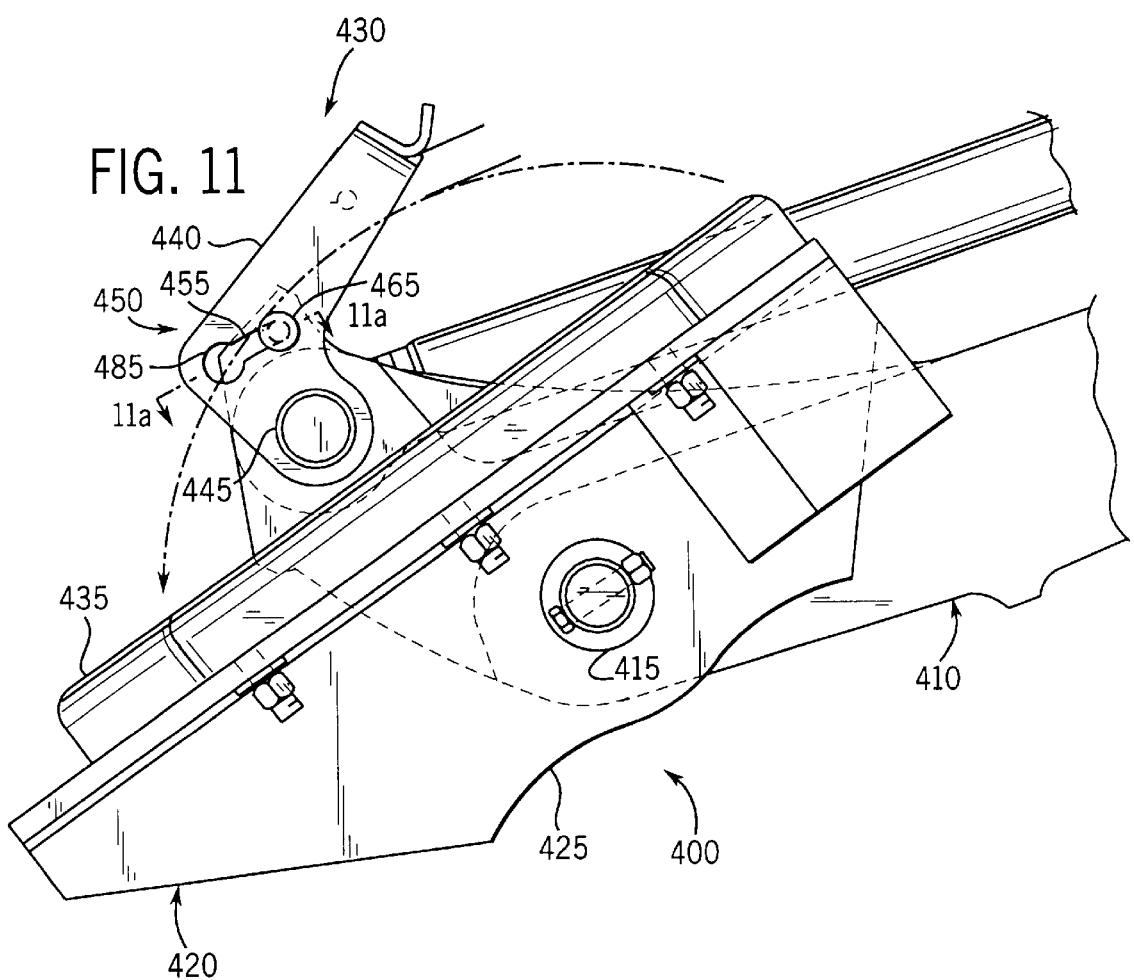

STABILIZER FLIP PAD ASSEMBLY FLIP-OVER RESTRAINT

FIELD OF THE INVENTION

The present invention relates to work vehicles that have support assemblies that include support leg assemblies and stabilizer flip pad assemblies. More particularly, the present invention relates to an apparatus and method for limiting, restricting or otherwise controlling the rotation of a stabilizer flip pad assembly on such a work vehicle.

BACKGROUND OF THE INVENTION

Many work vehicles, including construction work vehicles and agricultural work vehicles, perform functions that reduce the stability of the work vehicles with respect to the ground. For example, a construction vehicle such as a loader-backhoe can perform the function of digging a hole using a boom assembly attached to the rear of the loader-backhoe. As the boom assembly digs into the ground, force (and torque) is applied to the loader-backhoe tending to cause the loader-backhoe to be lifted off of the ground. Further, as the boom assembly lifts dirt (or other material) out of the ground, force is applied to the loader-backhoe in the opposite direction (and torque is applied tending to cause the front of the loader backhoe to tilt upwards). Additionally, lateral forces (and torques) are experienced by the loader-backhoe as the boom assembly is moved with respect to the loader backhoe, tending to cause the loader-backhoe to shift its position in relation to the ground. For at least these reasons, the application of such forces (and torques) upon the loader-backhoe tend to destabilize the loader-backhoe.

Because the performance of such functions by work vehicles tends to reduce the stability of the work vehicles, many of such work vehicles are equipped with support assemblies including support leg assemblies and stabilizer flip pad assemblies. Such support assemblies are designed to increase the stability of the work vehicles from what it would otherwise be if the work vehicles were supported only by wheels (or tracks, etc.) with respect to the ground. The support assemblies provide additional points of contact with the ground over which the forces experienced by the work vehicles are distributed. In addition, the support leg assemblies of the support assemblies of a work vehicle (when in operation) typically extend outwards from the body of the work vehicle. Consequently, the torques experienced by the work vehicle are less likely to produce movement of the vehicle. Further, the support assemblies provide more friction with respect to the ground, reducing the tendency of the work vehicle to shift laterally.

Such support assemblies on work vehicles, however, are only effective if the support assemblies have effective traction with respect to the ground. Thus, support assemblies typically include feet or pads at the bases of the support leg assemblies, which interface the ground. The pads are typically rotatable so that they can interface the ground at a variety of angles despite variation in the slope of the surface of the ground. Further, the pads typically have two different types of support or interface surfaces on opposite sides of the pads, for interfacing different types of ground surfaces. Typically, each pad has a first surface that is a cleat surface, for interfacing dirt or rocky soil, and also has a second, rubber surface (on the opposite side of the pad) that is for interfacing concrete or blacktop (or other smooth surfaces). Because the pads are rotatable, the pads can be rotated (or flipped) so that either the first or second surface will interface with the ground (hence, the pads are referred to as "stabilizer flip pad assemblies").

For maximum traction, it is important that the proper interface surface of a stabilizer flip pad assembly be in contact with the ground. Nevertheless, it is common that during the operation of a work vehicle a stabilizer flip pad assembly inappropriately rotates such that the wrong interface surface of the stabilizer flip pad assembly is in contact with the ground. An operator typically will carefully position a stabilizer flip pad assembly while the support leg assembly (to which the stabilizer flip pad assembly is attached) is in a raised position off of the ground so that, when the support leg assembly is lowered, the proper surface of the stabilizer flip pad assembly will interface the ground. However, due to forces encountered by the work vehicle while the support assembly is in the air (as well as due to forces generated by the motion of the support assembly itself), the stabilizer flip pad assembly can further rotate even after its position has been set by the operator, such that the stabilizer flip pad assembly is in the wrong position by the time the support assembly is fully lowered to the ground. Such undesirable rotation is especially common if the different interface surfaces of the stabilizer flip pad assembly are differently-weighted such that the stabilizer flip pad assembly has a tendency to rotate to a particular position due to gravity.

In addition, a stabilizer flip pad assembly can rotate to an improper position even when the support assembly to which the stabilizer flip pad assembly is attached is in use (i.e., while the support assembly is lowered to the ground). Due to the forces (and torques) experienced by a work vehicle (which can cause the vehicle to bounce up and down on the ground), there are times when a stabilizer flip pad assembly can lift off of the ground and rotate unexpectedly (while in the air).

If the stabilizer flip pad assembly rotates so that the proper interface surface is no longer positioned to interface the ground, the traction of the work vehicle with respect to the ground will be compromised. Various systems are currently known for limiting the amount of rotation of stabilizer flip pad assemblies, including rubber or neoprene restraints (which deflect under load). However, such rubber and neoprene restraints are often unreliable in limiting the rotation of the stabilizer flip pad assemblies, and are quickly worn out in the harsh environments in which work vehicles are typically operated.

Accordingly, it would be advantageous to develop a new apparatus and method for limiting or controlling the rotation of stabilizer flip pad assemblies to prevent undesired flipping of the stabilizer flip pad assemblies. Further, it would be advantageous to develop such an apparatus and method for limiting the rotation of stabilizer flip pad assemblies that is highly reliable in its operation, and is durable. Additionally, it would be advantageous to develop such an apparatus and method that is simple to operate, and simple and inexpensive to manufacture.

SUMMARY OF THE INVENTION

The present invention relates to an apparatus for limiting rotation of a stabilizer flip pad assembly in a support assembly for a work vehicle, where the support assembly includes a support leg assembly and the stabilizer flip pad assembly, the stabilizer flip pad assembly is rotatably attached to the support leg assembly, and the apparatus limits rotation of the stabilizer flip pad assembly to prevent undesired flipping of the stabilizer flip pad assembly. The apparatus includes a locking pin assembly supported by the support leg assembly and including a locking pin, and a restraint arm rotatably supported by the support leg assembly at a rotation axis proximate a first end of the restraint arm. The restraint arm includes a restraint protrusion proximate a second end of the restraint arm and extending perpendicular to a plane of rotation of the restraint arm wherein the restraint protrusion limits rotation of the stabilizer flip pad assembly when the restraint arm is in an extended position, and allows rotation of the stabilizer flip pad assembly past the restraint protrusion when the restraint arm is in a retracted position. The restraint arm also includes a slot configured to receive the locking pin, wherein the locking pin moves within the slot when the restraint arm rotates, and the restraint arm is capable of being locked in the extended position by the locking pin.

The present invention further relates to a support assembly for supporting a work vehicle on the ground. The support assembly includes a support leg assembly, a stabilizer flip pad assembly rotatably attached to the support leg assembly at a stabilizer pad pivot pin, a locking pin assembly supported by the support leg assembly and including a locking pin, and a restraint arm including first and second ends. The stabilizer flip pad assembly includes first and second support surfaces having first and second textures, respectively, and is rotatable between first and second positions in which the first and second support surfaces are configured to engage the ground. The stabilizer flip pad assembly is prevented from rotating greater than a full rotation by a stop bar of the stabilizer flip pad assembly. The restraint arm is rotatably supported by the support leg assembly at a restraint arm pivot pin that intersects the restraint arm proximate the first end of the restraint arm, and further includes a slot configured to receive the locking pin so that the locking pin moves relative to the slot as the restraint arm rotates. The second end of the restraint arm cuts into a rotational arc formed by the stabilizer flip pad assembly as the restraint arm is rotationally extended to limit rotation of the stabilizer flip pad assembly when the restraint arm is extended, and the second end of the restraint arm exits the rotational arc as the restraint arm is rotationally retracted to allow the stabilizer flip pad assembly to rotate past the second end when the restraint arm is retracted. The restraint arm is capable of being locked in the extended position by the locking pin.

The present invention additionally relates to an apparatus for limiting rotation of a stabilizer flip pad assembly in a support assembly for a work vehicle, where the support assembly includes a support leg assembly and the stabilizer flip pad assembly, the stabilizer flip pad assembly has first and second support surfaces and is rotatably attached to the support leg assembly, and the apparatus limits rotation of the stabilizer flip pad assembly to prevent undesired flipping of the stabilizer flip pad assembly. The apparatus includes a restraining means for limiting rotation of the stabilizer flip pad assembly when in a first position, and for allowing rotation of the stabilizer flip pad assembly when in a second position, where the restraining means is supported by the support leg assembly and is capable of rotation with respect to the support leg assembly. The apparatus also includes a locking means for locking the restraining means in the first position, where the locking means is adjoined to the restraining means and is supported by the support leg assembly.

The present invention further relates to a method of controlling rotation of a stabilizer flip pad assembly in a support assembly, where the support assembly includes a support leg assembly and a stabilizer flip pad assembly, the stabilizer flip pad assembly has a first support surface and a second support surface and is rotatably attached to the support leg assembly, and the method of controlling rotation of the stabilizer flip pad assembly is to prevent undesired flipping of the stabilizer flip pad assembly. The method includes the steps of providing a locking pin assembly configured to be supported by the support leg assembly and including a locking pin, and providing a restraint arm configured to be supported by the support leg assembly, where the restraint arm includes a slot that is configured to receive the locking pin. The method further includes the step of rotating the restraint arm with respect to the support leg assembly at a rotation axis proximate a first end of the restraint arm so that the restraint arm is extended to intersect a rotational arc created by the stabilizer flip pad assembly, and so that the locking pin moves relative to the slot. The method additionally includes the step of locking the restraint arm in an extended position with respect to the locking pin assembly so that the stabilizer flip pad assembly cannot rotate past the restraint arm.

BRIEF DESCRIPTION OF THE DRAWINGS

The exemplary embodiments will become more fully understood from the following detailed description, taken in conjunction with the accompanying drawings, wherein like reference numerals refer to like parts, in which:

FIG. 2 is a side elevation view of a base of a support assembly that includes a stabilizer flip pad assembly supported by a support leg assembly, and further includes a stabilizer flip pad flip-over restraint according to the present invention, wherein the flip-over restraint includes a locking assembly and a restraint arm that is shown extended so as to limit the rotation of the stabilizer flip pad assembly.

FIG. 2a is a cross-sectional view of the locking assembly of FIG. 2, which is used to lock the restraint arm of FIG. 2 in place so that the stabilizer flip pad flip-over restraint limits the rotation of the stabilizer flip pad assembly.

FIG. 3 is a side elevation view of the base of the support assembly (including the stabilizer flip pad assembly, support leg assembly, and stabilizer flip pad flip-over restraint) of FIG. 2, wherein the restraint arm is shown to be retracted so that the stabilizer flip pad flip-over restraint does not limit the rotation of the stabilizer flip pad assembly.

FIG. 3a is a cross-sectional view of the locking assembly of FIG. 2a that can be used to lock the restraint arm of FIGS. 2 and 3 in place, shown to be unlocked so that the restraint arm is not locked in place (and has been moved to the retracted position).

FIG. 4 is a top plan view of the base of the support assembly of FIG. 2, wherein the restraint arm is shown to be limiting the rotation of the stabilizer flip pad assembly.

FIGS. 5 and 6 are side elevation views of the base of the support assembly of FIG. 2, wherein rubber pad and cleat surfaces of the stabilizer flip pad assembly are respectively shown as interfacing the ground, and wherein the restraint arm is shown to be positioned so that the rotation of the stabilizer flip pad assembly is limited (in both FIGS. 5 and 6).

FIG. 7 is a perspective view of a base of a support assembly that includes a stabilizer flip pad assembly, a support leg assembly, and a stabilizer flip pad flip-over restraint including a restraint arm and a locking assembly, wherein the locking assembly includes a leaf-spring in accordance with a second embodiment of the invention.

FIGS. 7a and 7b are cross-sectional views of the locking assembly of FIG. 7, wherein the leaf spring is shown in, respectively, an undeflected position for locking the restraint arm in an extended position and a deflected position in which the restraint arm is rotatable.

FIG. 10 is a perspective view of a base of a support assembly that includes a stabilizer flip pad assembly, a support leg assembly, and a stabilizer flip pad flip-over restraint including a restraint arm and a locking assembly with a spring-loaded locking pin for locking the restraint arm in place.

FIGS. 10a and 10b are cross-sectional views of the locking assembly of FIG. 10, wherein the spring-loaded locking pin is shown in, respectively, a first position where a head of the locking pin engages the restraint arm, and a second position where the head of the locking pin is disengaged from the restraint arm.

FIG. 11 is a side elevation view of the base of the support assembly of FIG. 10 showing the spring-loaded locking pin in a second position where the head of the locking pin is disengaged from the restraint arm, showing the restraint arm in a retracted position, and further showing that the stabilizer flip pad assembly is rotatable past the restraint arm when the restraint arm is in the retracted position.

FIG. 11a is a cross-sectional view of the locking assembly of FIG. 10, wherein the spring-loaded locking pin is shown in a second position where the head of the locking pin is disengaged from the restraint arm, and wherein the restraint arm is in the retracted position.

DETAILED DESCRIPTION OF THE PREFERRED EMBODIMENTS

Figure 1:
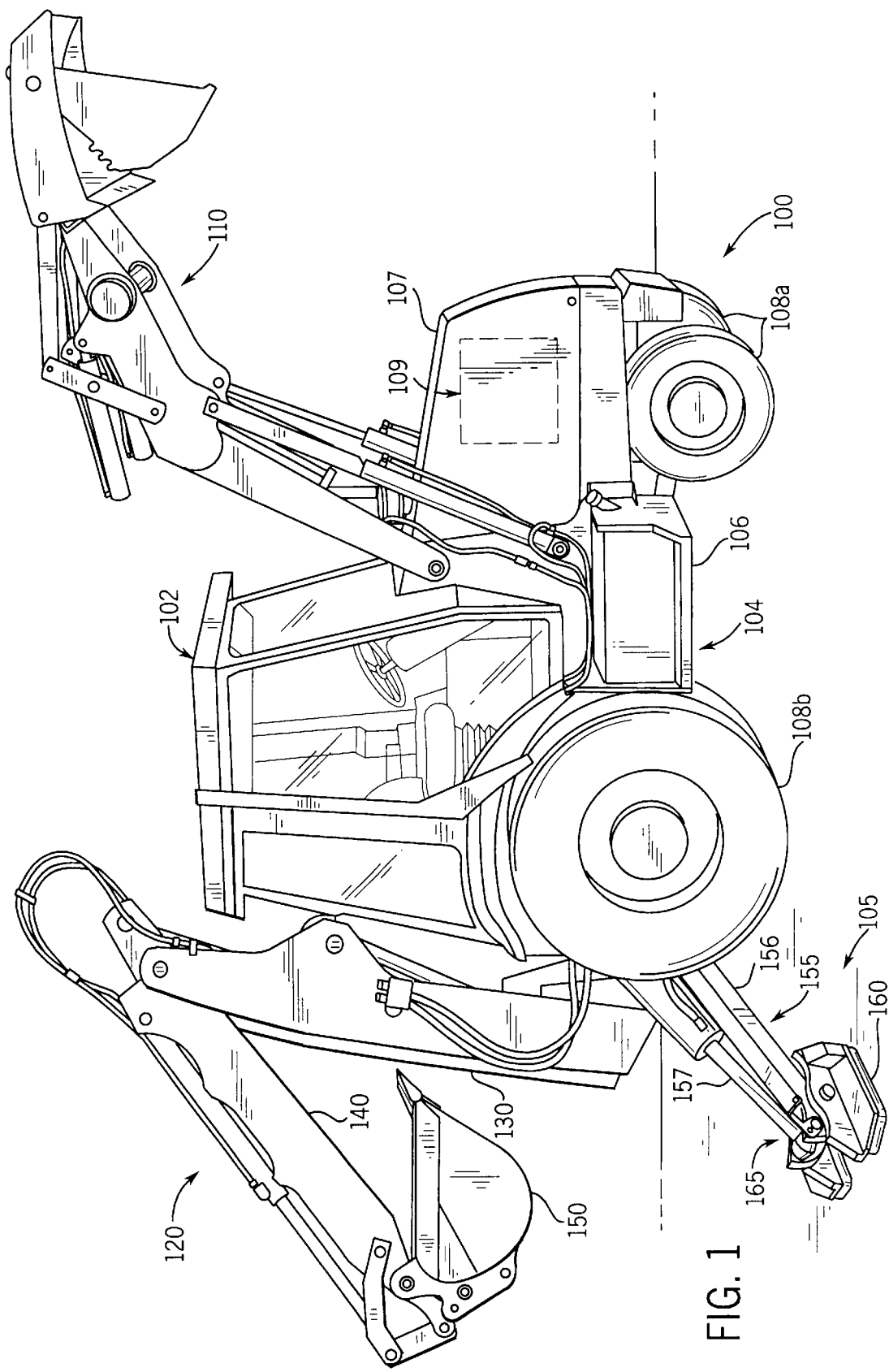
FIG. 1 is a perspective view of an exemplary work vehicle (shown as a loader-backhoe) having support assemblies including support leg assemblies, stabilizer flip pad assemblies, and stabilizer flip pad flip-over restraints in accordance with the present invention.

Referring to FIG. 1, a loader-backhoe 100 is shown. Loader-backhoe 100 is representative of construction work vehicles such as the Case Corp. 580L, 580 Super L and 590 Super L Loader/Backhoes, and is an exemplary work vehicle on which the present invention can be employed. In alternate embodiments, the present invention can also be employed in other construction work vehicles, agricultural work vehicles, or other work vehicles. Loader-backhoe 100 has an operator cab 102 (provided with a variety of instruments and operator controls) mounted on a base 104, and a chassis 106 having front wheels 108a and rear wheels 108b. Support assemblies 105 (one is shown) are extendable from the sides of loader-backhoe 100 adjacent each of rear wheels 108b, and provide enhanced support and stability as excavation is performed by the loader-backhoe.

Support assemblies 105 each include a support leg assembly 155, a stabilizer flip pad assembly 160, and a stabilizer flip pad flip-over restraint 165 (three embodiments of which are described with respect to FIGS. 2–11a). Support leg assembly 155 includes a support leg 156 and a cylinder assembly 157 which retracts and extends to respectively raise and lower the support leg. Also mounted on base 104 is an engine or power plant 109 which powers various drive train and hydraulic system elements (not shown), and which is located within an enclosed compartment 107. Further, loader-backhoe 100 includes a loader assembly 110, which is located at the front end of the loader-backhoe in proximity to enclosed compartment 107.

Loader-backhoe 100 also includes a boom assembly 120 pivotally mounted to base 104 of the vehicle at a swing tower (through a pin and clevis arrangement) providing for selective rotation of the boom assembly (in a generally horizontal plane) with respect to the base of the loader-backhoe about a generally vertical pivot axis. Pivotal rotation of boom assembly 120 about the axis is achieved through a pair of actuating hydraulic swing cylinders (not shown). Boom assembly 120 includes three manipulable segments which are arranged and controlled to operate cooperatively, as implemented in the Case Corp. 580L, 580 Super L and 590 Super L Loader/Backhoes. These segments include a boom 130, a dipper 140 and a bucket 150, each pivotally coupled in an arrangement to allow selective rotation of one segment with respect to another (or with respect to base 104) about a generally horizontal pivot axis. Through coordinated articulation of each of these segments by the operator, boom assembly 120 can be productively employed in such tasks as excavation.

Referring to FIGS. 2 and 3, a base portion 200 of a support assembly (such as support assembly 105 of FIG. 1) is shown, in which a first embodiment of the present invention is employed. Base portion 200 includes a support leg assembly 210 that extends from a work vehicle (such as loader-backhoe 100), a stabilizer flip pad assembly 220 and a stabilizer flip pad flip-over restraint 230. Support leg assembly 210 includes a cylinder assembly 211 and a support leg 212. Stabilizer flip pad assembly 220 is rotatable with respect to support leg assembly 210 around pivot pin 215. Stabilizer flip pad assembly 220 is configured to interface with the ground when support leg assembly 210 is lowered, such that the stabilizer flip pad assembly (and the support assembly generally) provides additional support for (and increase the stability of) the work vehicle. Stabilizer flip pad assembly 220 includes a cleat 226 and a rubber pad 223, which is attached to the remainder of the stabilizer flip pad assembly by way of bolts 224. Stabilizer flip pad assembly 220 further has two different support or interface surfaces, a first cleat surface 225 and a second rubber surface 235. Cleat surface 225 is more effective for providing traction between the ground and the support assembly when the ground is dirt or rocky soil, while rubber surface 235 is more effective for providing traction between the ground and the support assembly when the ground is concrete or blacktop. By rotating stabilizer flip pad assembly 220 accordingly, the stabilizer flip pad assembly is positionable so that either cleat surface 225 or rubber surface 235 interfaces with the ground. As shown (see, e.g., FIG. 4), stabilizer flip pad assembly 220 includes two halves 221,222 (each having a cleat surface and a rubber surface), which are on opposite sides of support leg assembly 210.

Stabilizer flip pad flip-over restraint 230 is a system that includes a restraint bar or arm 240 that is rotatable about a pivot pin 245 such that the restraint arm is rotatable into an extended position and a retracted position (or positions in between the extended and retracted positions). Pivot pin 245 also is shown to protrude through a rod eye 248 of cylinder assembly 211 of support leg assembly 210 and to couple support leg 212 of the support leg assembly to the cylinder assembly (although in alternate embodiments, separate pivot pins are used to support restraint arm 240 and to couple the support leg and cylinder assembly). Restraint arm 240 is of sufficient length so that, when in the extended position (or even possibly in a partly-extended position), the restraint arm intersects the path of stabilizer flip pad assembly 220 and consequently limits the rotation of the stabilizer flip pad assembly, as shown in FIG. 2 (the path formed by the stabilizer flip pad assembly as it rotates is circular, as shown in FIG. 3). However, when retracted, restraint arm 240 does not intersect the path of stabilizer flip pad assembly 220 and so the stabilizer flip pad assembly is able to rotate freely past the restraint arm (as shown in FIG. 3).

Included within stabilizer flip pad flip-over restraint 230 is a locking assembly 250, which is shown in detail in FIGS. 2a and 3a. Locking assembly 250 allows restraint arm 240 to be locked in place (i.e., in the retracted, extended or other positions). (Without such a locking capability, restraint arm 240 would not be capable of withstanding forces from stabilizer flip pad assembly 220 and consequently would not be useful in limiting the rotation of the stabilizer flip pad assembly.) Locking assembly 250 includes a locking pin or bolt 260 which protrudes through (and is supported by) support leg assembly 210. Locking bolt 260 also protrudes through a slot 255 in restraint arm 240. Slot 255 is a short arc (and consequently is nearly linear) through which locking bolt 260 moves as restraint arm 240 is extended or retracted (as shown in FIG. 2). The movement of restraint arm 240 is limited by either end of slot 255 insofar as bolt 260 only moves within the region prescribed by the slot.

Locking assembly 250 further includes a nut 275 that is affixed to one end of locking bolt 260, a belleville washer 280 positioned between nut 275 and support leg assembly 210 (out of which locking bolt 260 protrudes), a friction disk 270 (or other washer-type element), and a head 265 of the locking bolt. Friction disk 270 is pressed against restraint arm 240 by head 265 and, depending upon the pressure between the friction disk and the restraint arm, creates more or less friction for limiting the movement of locking bolt 260 with respect to the restraint arm. The amount of pressure between friction disk 270 and restraint arm 240 depends upon the degree to which belleville washer 280 is compressed, which depends upon the degree to which nut 275 is tightened with respect to locking bolt 260.

As discussed, FIGS. 2 and 3 respectively show base 200 in a first situation where restraint arm 240 is extended (limiting rotation of stabilizer flip pad assembly 220) and a second situation where the restraint arm is retracted (such that the rotation of the stabilizer flip pad assembly is not limited by the restraint arm). FIGS. 2a and 3a respectively show cross-sectional views of locking assembly 250 in each of these situations. Specifically, FIG. 2a shows locking bolt 260 positioned towards the left end of slot 255 (corresponding to the extension of restraint arm 240), while FIG. 3a shows the locking bolt positioned towards the right end of the slot (corresponding to the retraction of the restraint arm). In FIG. 2a, however, locking bolt 260 is not positioned as far as possible towards the left end of slot 255; that is, restraint arm 240 is in an extended position but is not extended as far as possible. Thus, locking assembly 250 allows for the locking of restraint arm 240 in a variety of retracted and extended positions. To move restraint arm 240, an operator must merely loosen nut 275 to relieve the pressure between friction disk 270 and the restraint arm, move the restraint arm to the desired position, and (to lock the restraint arm in place) retighten nut 275. Alternatively, an operator can use a cheater bar (not shown) to move restraint arm 240, without loosening nut 275.

As shown in FIG. 2, restraint arm 240 includes a first segment 232 and a second segment 234 that are effectively perpendicular and intersect, such that the restraint arm is L-shaped. Pivot pin 245 (about which restraint arm 240 rotates) intersects the restraint arm on second segment 234, while first segment 232 is the portion of the restraint arm which contacts (and limit the rotation of) stabilizer flip pad assembly 220. Locking assembly 250 is located at the intersection of first and second segments 232,234. Because of the L-shape of restraint arm 240, the path of locking pin 260 (through slot 255 of the restraint arm) with respect to the restraint arm is still predominantly parallel to first segment 232.

Although restraint arm 240 is shown to be L-shaped, in alternate embodiments, the restraint arm takes on additional shapes. For example, in an alternate embodiment, restraint arm 240 is simply an I-shaped (i.e., purely linear) segment that rotates around a pivot pin that intersects one end of the restraint arm. In such case, the path of a locking pin (and the orientation of a slot through which the locking pin would move) would be substantially perpendicular to the axis of the I-shaped restraint arm. Additional shapes for restraint arm 240 in alternate embodiments could include, for example, a rounded shape (i.e., an arc shape).

As discussed, restraint arm 240 is designed to limit the rotation of stabilizer flip pad assembly 220 so as to prevent undesired flipping of the stabilizer flip pad assembly. Without such a device, stabilizer flip pad assembly 220 can flip during operation of the work vehicle such that, instead of cleat surface 225 interfacing the ground (as is desired because the work vehicle is operating on rocky soil), rubber surface 235 interfaces the ground (or vice-versa). As shown in FIG. 2, restraint arm 240 is capable of limiting the rotation of stabilizer flip pad assembly 220 insofar as the stabilizer flip pad assembly cannot rotate past the extended restraint arm in the counter-clockwise direction. However, restraint arm 240 is not capable of limiting the rotation of stabilizer flip pad assembly 220 in the opposite (i.e., clockwise) direction to prevent undesired flipping. Rather, as shown in FIG. 4, stabilizer flip pad assembly 220 includes a restraint bar 205 which limits rotation in the opposite direction. Restraint bar 205 limits the rotation of stabilizer flip pad assembly 220 because the restraint bar encounters support leg assembly 210 once the stabilizer flip pad assembly has rotated sufficiently far. Restraint bar 205 has the additional purpose of coordinating (i.e., linking) the rotation of the two halves 221, 222 of stabilizer flip pad assembly 220.

While restraint bar 205 is included in the embodiments of the invention shown in the FIGS., in alternate embodiments other elements are used to limit the rotation of stabilizer flip pad assembly 220 in the direction opposite to the direction of rotation that is limited by restraint arm 240. For example, in an embodiment of the invention where the two halves of a stabilizer flip pad assembly were not linked (such that each of the two halves of the stabilizer flip pad assembly could rotate independently of one another), restraint bar 205 could be replaced with individual restraint flanges extending off of each of the halves of the stabilizer flip pad assembly. Further, in alternate embodiments, stabilizer flip pad flip-over restraint 230 could include, in addition to restraint arm 240 and locking assembly 250, a second restraint arm and locking assembly. Such a second restraint arm could be extended in a direction approximately opposite that of restraint arm 240, and the two restraint arms together could limit rotation of stabilizer flip pad assembly 220 in both rotational directions.

Further referring to FIG. 4, restraint arm 240 is shown to include a restraint finger or protrusion 290. Restraint protrusion 290 is the portion of restraint arm 240 which actually intersects the circular path formed by stabilizer flip pad assembly 220 as it rotates. That is, without restraint protrusion 290, restraint arm 240 would not limit the rotation of stabilizer flip pad assembly 220. While restraint protrusion 290 is shown as a flange protruding off of restraint arm 240, in alternate embodiments the restraint protrusion could have a different shape or be a different element; for example, instead of including a flange, a bolt could be attached to and protrude out of the restraint arm.

As shown in FIG. 4, restraint arm 240 rotates about an axis (i.e., the axis formed by pivot pin 245) that is parallel to the axis about which stabilizer flip pad assembly 220 rotates (i.e., the axis formed by pivot pin 215). Because restraint arm 240 is positioned close to support leg assembly 210 and not positioned directly over stabilizer flip pad assembly 220, restraint protrusion 290 is necessary so that a portion of the restraint arm comes into contact with the stabilizer flip pad assembly when the restraint arm is extended and the stabilizer flip pad assembly rotates. However, in alternate embodiments, restraint protrusion 290 would not be necessary. For example, the restraint arm could be positioned farther away from the support leg assembly so that it was directly above the stabilizer flip pad assembly. Additionally, the restraint arm could be configured to rotate about an axis that was not parallel to the axis formed by pivot pin 215. For example, the restraint arm could rotate about an axis that is perpendicular (or simply oblique) to the axis formed by pivot pin 215. In such case, the restraint arm could rotate from a position at which the restraint arm was completely positioned above the support leg assembly to a position that extended out from the support leg assembly and intersected the rotational path of the stabilizer flip pad assembly. In further alternate embodiments, the restraint arm could include multiple parts (as opposed to merely a single part) and be extended telescopically.

FIGS. 5 and 6 respectively show base 200 interfacing the surface of the ground. In FIG. 5, stabilizer flip pad assembly 220 is orientated so that rubber surface 235 interfaces t he ground. Such a configuration would b e appropriate where the ground was concrete or blacktop. In FIG. 6, stabilizer flip pad assembly 220 is orientated so that cleat surface 225 interfaces the ground. Such a configuration would be appropriate where the ground was dirt or rocky soil.

Although locking assembly 250 is shown (in FIGS. 2–6) to include locking bolt 260, head 265, friction disk 270, nut 275 and belleville washer 280, alternate embodiments of the locking assembly are also possible. For example, in one alternate embodiment, head 265 is enlarged so that friction disk 270 is not necessary (i.e., the head would be in direct contact with restraint arm 240 to provide the necessary friction to lock the restraint arm). In another alternate embodiment, belleville washer 280 is replaced by another element to generate the pressure between locking bolt 260 (or friction disk 270) and restraint arm 240; in fact, tightening of nut 275 alone against support leg assembly 210 (without any intermediary belleville washer or other element) can be effective for providing pressure sufficient to lock the restraint arm in place.

Turning to FIGS. 7–11, two additional base portions 300 and 400 of a support assembly (such as support assembly 105 of FIG. 1) are shown, in which a second embodiment and a third embodiment of the present invention are respectively employed. Base portions 300,400 respectively include support leg assemblies 310,410 that extend from a work vehicle (such as loader-backhoe 100), stabilizer flip pad assemblies 320,420 that are rotatable with respect to the support leg assemblies at pivot pins 315,415, and stabilizer flip pad flip-over restraints 330,430. Stabilizer flip pad assemblies 320,420 respectively have cleat surfaces 325, 425, rubber surfaces 335,435 and restraint bars 305,405. Stabilizer flip pad flip-over restraints 330,430 respectively include restraint arms 340,440 that have restraint protrusions 390,490 and that rotate about pivot pins 345,445, and also include locking assemblies 350,450.

Figure 8:
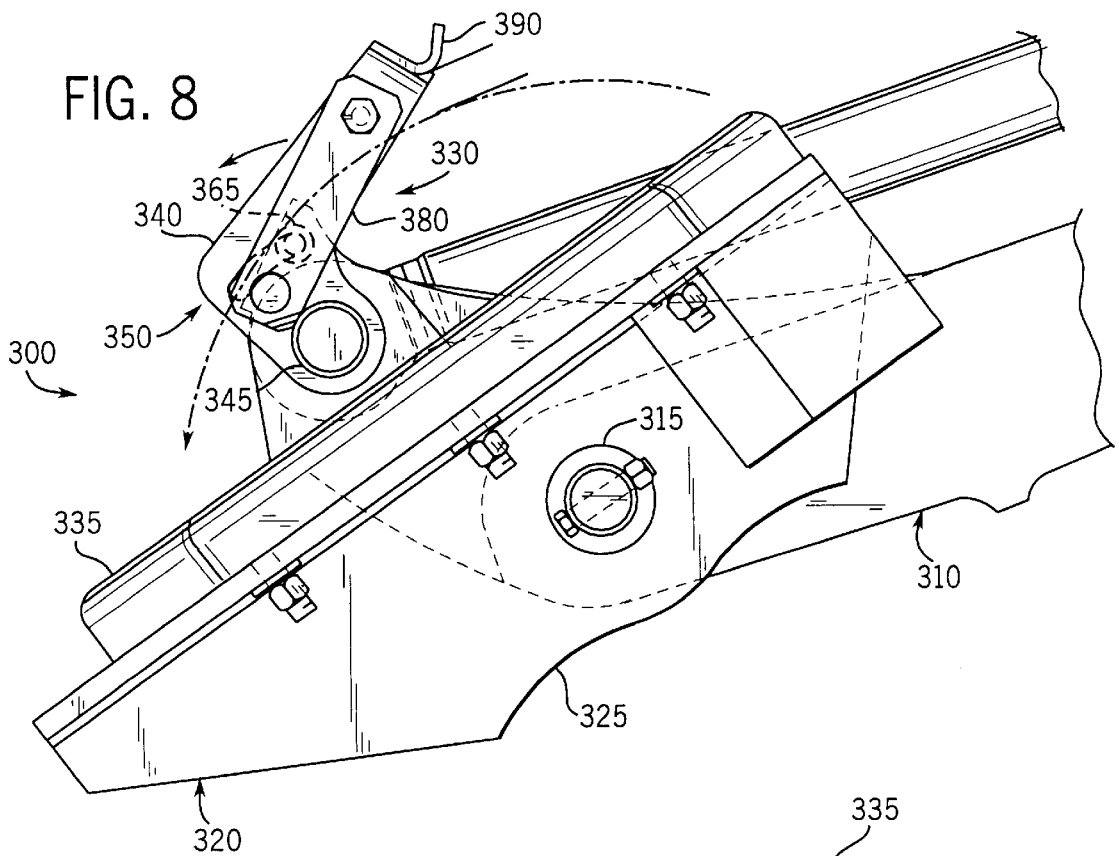
FIG. 8 is a side elevation view of the base of the support assembly of FIG. 7 showing the leaf spring in a deflected position and the restraint arm in a retracted position, and further showing that the stabilizer flip pad assembly is rotatable past the restraint arm when the restraint arm is in the retracted position.
Figure 9:
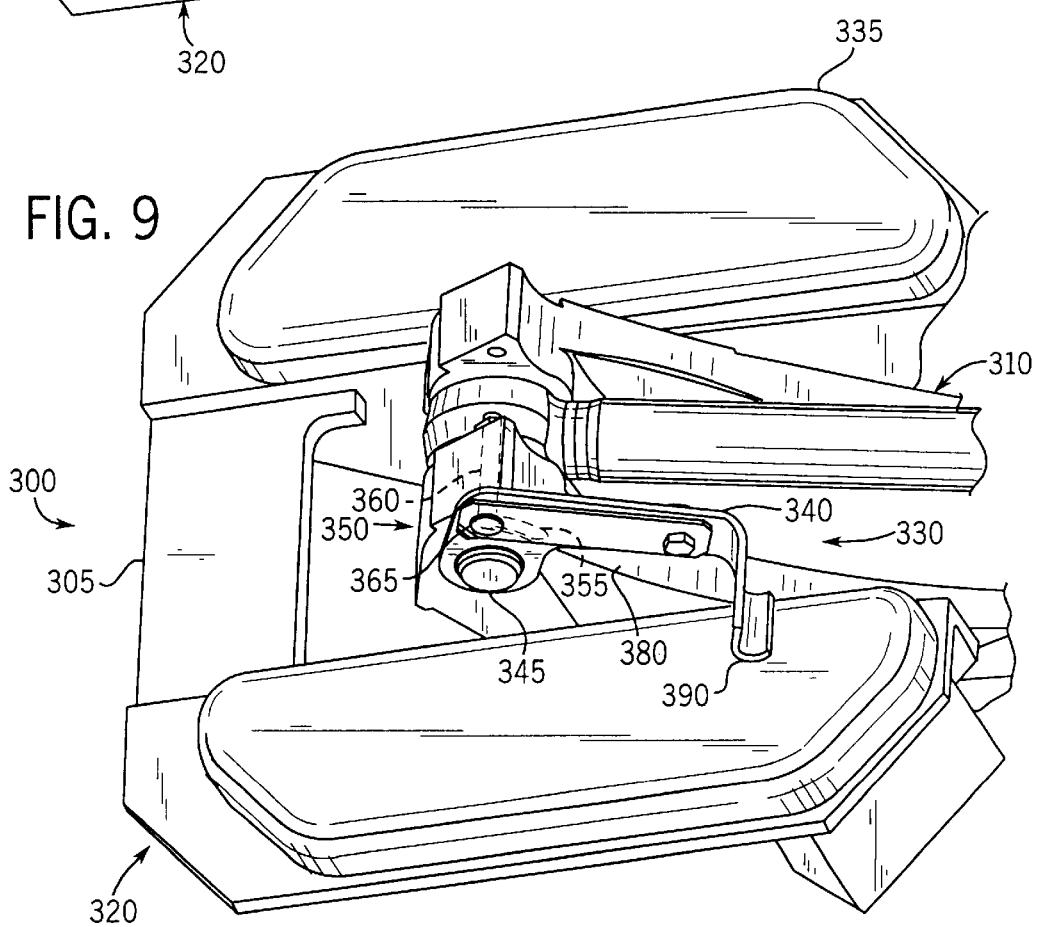
FIG. 9 is a perspective view of the base of the support assembly of FIG. 7 showing the leaf spring in an undeflected position and the restraint arm in an extended position for limiting the rotation of the stabilizer flip pad assembly.

The second and third embodiments of the invention employed on base portions 300,400 differ from the first embodiment of the invention (shown employed on base portion 200) in that locking assemblies 350,450 differ from locking assembly 250. Turning to FIGS. 7–9, and in particular FIGS. 7a and 7b, locking assembly 350 is shown. Locking assembly 350 includes a leaf spring 380 that is coupled to restraint arm 340 by way of a fastener 385 (e.g., a bolt or screw and a nut, or a fastening compound such as glue; it is also possible, in alternate embodiments, that the leaf spring is actually a part of the restraint arm). Locking assembly 350 further includes a locking bolt 360 protruding through (and supported by) support leg assembly 310. As with respect to restraint arm 240, restraint arm 340 has a slot 355, through which bolt 360 protrudes. Bolt 360 includes a large head or boss 365 at the end of the bolt that protrudes through restraint arm 340, and further includes a nut 375 at the other end of the bolt. Leaf spring 380 includes a notch or aperture 370 which is sized to fit over boss 365.

Locking assembly 350 operates to lock restraint arm 340 in an extended position, and to unlock the restraint arm (to allow the restraint arm to be retracted), as follows. As shown in FIGS. 7a and 9, when restraint arm 340 is in the extended position (for limiting rotation of stabilizer flip pad assembly 320), bolt 360 is positioned at the left end of slot 355. Consequently, notch 370 of leaf spring 380 fits directly over boss 365, and leaf spring 380 is able to rest against restraint arm 340. Because notch 370 of leaf spring 380 fits directly over boss 365 (and because the leaf spring is attached to restraint arm 340), the restraint arm is unable to move from (and is locked into) the extended position. However, if leaf spring 380 is deflected (through the use of a screwdriver, or otherwise) such that notch 370 of the leaf spring is lifted off of boss 365, restraint arm 340 is then able to move freely and is retractable. As shown in FIGS. 7b and 8, when restraint arm 340 is in the fully retracted position, bolt 360 is positioned at the right end of slot 355, boss 365 is wedged in between leaf spring 380 and the restraint arm, and stabilizer flip pad assembly 320 is able to rotate without limitation by the restraint arm. Leaf spring 380 is rotatable about fastener 385. Once deflected, leaf spring 380 can be rotated so that notch 370 is not positioned directly over boss 365 (consequently, the leaf spring does not need to be held in a deflected position for as long of a time in order to allow retraction of restraint arm 340).

Turning to FIGS. 10–11, and in particular FIGS. 10a, 10b, and 11a, locking assembly 450 is shown. Locking assembly 450 includes a stop or locking bolt 460 that protrudes through (and is supported by) support leg assembly 410. As with respect to restraint arms 240 and 340, restraint arm 440 has a slot 455, through which bolt 460 protrudes. Bolt 460 includes a large head 465 at the end of the bolt that protrudes through restraint arm 440, and further includes a nut 475 at the other end of the bolt. Between nut 475 and support leg assembly 410 along bolt 460 is a compression spring 480, which tends to keep nut 475 as far from support leg assembly 410 as possible. In contrast to slots 255 and 355, slot 455 of restraint arm 440 includes an enlargement or recess 485 at one end (as shown, the left end) of the slot. Unlike the remainder of slot 455, recess 485 is sufficiently large to allow head 465 of bolt 460 to slip into the slot and rest directly against support leg assembly 410.

Locking assembly 450 operates to lock restraint arm 440 in an extended position, and to unlock the restraint arm (to allow the restraint arm to be retracted), as follows. As shown in FIGS. 10 and 10a, when restraint arm 440 is in the extended position (for limiting rotation of stabilizer flip pad assembly 420), bolt 460 is positioned at the left end of slot 455. Consequently, head 465 fits directly into recess 485 and consequently restraint arm 440 is unable to move from (and is locked into) the extended position. However, as shown in FIG. 10b, if pressure is applied (in the direction of arrow 476) to the end of bolt 460 at which nut 475 is located to compress compression spring 480, head 465 is moved out of recess 485 away from restraint arm 440. Restraint arm 440 is then able to move freely and is retractable. As shown in FIGS. 11 and 11a, when restraint arm 440 is in the fully retracted position, bolt 460 is positioned at the right end of slot 455, head 465 is positioned to the side of the restraint arm, and stabilizer flip pad assembly 420 is able to rotate without limitation by the restraint arm.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of work vehicles in which support assemblies or similar devices are employed to increase the stability of the work vehicles. Further, the exact design and operation of the stabilizer flip pad flip-over restraints can vary insofar as the flip-over restraints continue to accomplish the function of preventing undesired flipping or other movement of stabilizer flip pad assemblies or similar devices. Accordingly, all such modifications are intended to be included within the scope of the invention as defined in the following claims. Other substitutions, modifications, changes and omissions can be made in the design, operating conditions and arrangement of preferred and alternative embodiments without departing from the spirit of the invention as expressed in the appended claims.

What is claimed is:

1. In a support assembly for a work vehicle, the support assembly including a support leg assembly and a stabilizer flip pad assembly, the stabilizer flip pad assembly rotatably attached to the support leg assembly, an apparatus for limiting rotation of the stabilizer flip pad assembly to prevent undesired flipping of the stabilizer flip pad assembly, comprising:
   a locking pin assembly supported by the support leg assembly and including a locking pin; and
   a restraint arm rotatably supported by the support leg assembly at a rotation axis proximate a first end of the restraint arm, the restraint arm including
      a restraint protrusion proximate a second end of the restraint arm and extending perpendicular to a plane of rotation of the restraint arm wherein the restraint protrusion limits rotation of the stabilizer flip pad assembly when the restraint arm is in an extended position, and allows rotation of the stabilizer flip pad assembly past the restraint protrusion when the restraint arm is in a retracted position, and
      a slot configured to receive the locking pin, wherein the locking pin moves within the slot when the restraint arm rotates, and the restraint arm is capable of being locked in the extended position by the locking pin.

2. The apparatus of claim 1, wherein the stabilizer flip pad assembly includes first and second support surfaces, the first support surface is positioned to support the work vehicle when the restraint arm is in the extended position and the second support surface is positioned to support the work vehicle when the restraint arm is in the retracted position.

3. The apparatus of claim 1, wherein the locking pin is a bolt, the locking pin assembly further includes a belleville washer and a nut coupled to the bolt, and the restraint arm is locked with respect to the locking pin assembly by tightening the bolt with respect to the nut to compress the belleville washer to create a frictional force between the locking pin assembly and the restraint arm.

4. The apparatus of claim 3, wherein the locking pin assembly further includes a friction disc positioned between a head of the bolt and the restraint arm, the frictional force being created between the friction disc and the restraint arm.

5. The apparatus of claim 3, wherein the restraint arm is configured to be rotated with respect to the support leg assembly despite the frictional force through the additional input of torque on the restraint arm.

6. The apparatus of claim 1, further including a leaf spring positioned on a first side of the restraint arm over the slot, the leaf spring having a notch at a first end of the leaf spring, wherein the locking pin further includes a boss extending beyond the first side of the restraint arm to engage the notch of the leaf spring when the restraint arm is in the extended position to lock the restraint arm with respect to the locking pin assembly.

7. The apparatus of claim 6, wherein the leaf spring is attached to the restraint arm at a second end of the leaf spring.

8. The apparatus of claim 6, wherein the leaf spring is configured to be deflected away from the first side of the restraint arm to disengage the boss from the notch of the leaf spring to allow the restraint arm to freely rotate.

9. The apparatus of claim 1, wherein the restraint arm also has a recess proximate a first end of the slot, the recess having a dimension greater than that of the slot,
   the locking pin having a head adapted to fit within the recess but not within the slot, and the locking pin assembly further includes a compression spring for providing a compression force, and
   wherein the compression force of the compression spring causes the head to engage the recess when the restraint arm is in the extended position to lock the restraint arm with respect to the locking pin assembly.

10. The apparatus of claim 1, wherein the restraint protrusion is a shoulder extending from the second end of the restraint arm.

11. A support assembly for supporting a work vehicle on the ground, comprising:
   a support leg assembly;
   a stabilizer flip pad assembly rotatably attached to the support leg assembly at a stabilizer pad pivot pin and including first and second support surfaces having first and second textures, respectively, wherein the stabilizer flip pad assembly is rotatable between first and second positions in which the first and second support surfaces are configured to engage the ground, respectively, and the stabilizer flip pad assembly is prevented from rotating greater than a full rotation by a stop bar of the stabilizer flip pad assembly;
   a locking pin assembly supported by the support leg assembly and including a locking pin; and
   a restraint arm including first and second ends, the restraint arm rotatably supported by the support leg assembly at a restraint arm pivot pin that intersects the restraint arm proximate the first end of the restraint arm, and further including a slot configured to receive the locking pin so that the locking pin moves relative to the slot as the restraint arm rotates, wherein the second end of the restraint arm cuts into a rotational arc formed by the stabilizer flip pad assembly as the restraint arm is rotationally extended to limit rotation of the stabilizer flip pad assembly when the restraint arm is extended, and the second end of the restraint arm exits the rotational arc as the restraint arm is rotationally retracted to allow the stabilizer flip pad assembly to rotate past the second end when the restraint arm is retracted, and wherein the restraint arm is capable of being locked in the extended position by the locking pin.

12. The apparatus of claim 11, wherein the first support surface is a rubber pad and the second support surface is a cleat.

13. In a support assembly for a work vehicle, the support assembly including a support leg assembly having a support leg and a stabilizer flip pad assembly having first and second support surfaces, the stabilizer flip pad assembly rotatably attached to the support leg assembly, an apparatus for limiting rotation of the stabilizer flip pad assembly to prevent undesired flipping of the stabilizer flip pad assembly, comprising:

restraining means for limiting rotation of the stabilizer flip pad assembly when in a first position, and for allowing rotation of the stabilizer flip pad assembly when in a second position, the restraining means supported by the support leg assembly and capable of rotation with respect to the support leg assembly, and locking means for locking the restraining means in the first position, the locking means including a locking pin slidably coupled within a slot in the restraining means and supported by the support leg assembly and configured to lock the restraining means to the support leg regardless of the position of the support leg assembly.

14. In a support assembly including a support leg assembly and a stabilizer flip pad assembly having a first support surface and a second support surface, the stabilizer flip pad assembly rotatably attached to the support leg assembly, a method of controlling rotation of the stabilizer flip pad assembly to prevent undesired flipping of the stabilizer flip pad assembly, the method of controlling rotation comprising the steps of:

providing a locking pin assembly configured to be supported by the support leg assembly and including a locking pin, providing a restraint arm configured to be supported by the support leg assembly, the restraint arm including a slot configured to receive the locking pin, rotating the restraint arm with respect to the support leg assembly at a rotation axis proximate a first end of the restraint arm so that the restraint arm is extended to intersect a rotational arc created by the stabilizer flip pad assembly, and so that the locking pin moves relative to the slot, locking the restraint arm in an extended position with respect to the locking pin assembly so that the stabilizer flip pad assembly cannot rotate past the restraint arm regardless of the position of the support leg assembly.

15. The method of claim 14, further comprising the steps of unlocking the restraint arm with respect to the locking pin assembly so that the locking pin is free to move relative to the slot, and rotating the restraint arm with respect to the support leg assembly so that the restraint arm is retracted out of the rotational arc created by the stabilizer flip pad assembly, so that the stabilizer flip pad assembly is free to rotate past the restraint arm.

16. The method of claim 14, wherein the locking pin is a bolt, the locking pin assembly further includes a belleville washer and a nut, and the restraint arm is locked with respect to the locking pin assembly by tightening the bolt with respect to the nut to compress the belleville washer so that a frictional force is created between the locking pin assembly and the restraint arm.

17. The method of claim 16, further comprising the step of unlocking the restraint arm with respect to the locking pin assembly so that the locking pin is free to move relative to the slot, wherein the restraint arm is unlocked by loosening the bolt with respect to the nut to lessen the compression of the belleville washer so that the frictional force between the locking pin assembly and the restraint arm is reduced.

18. The method of claim 14, wherein the restraint arm further includes a leaf spring positioned on a first side of the restraint arm over the slot of the restraint arm, the leaf spring having a notch at a first end of the leaf spring, wherein the locking pin further includes a boss protruding from a first end of the locking pin, the boss also extending beyond the first side of the restraint arm, and wherein the restraint arm is locked with respect to the locking pin assembly when the boss of the locking pin engages the notch of the leaf spring.

19. The method of claim 18, further comprising the step of unlocking the restraint arm with respect to the locking pin assembly so that the locking pin is free to move relative to the slot, wherein the restraint arm is unlocked by deflecting the leaf spring away from the first side of the restraint arm so that the boss no longer engages the notch of the leaf spring, and so that the restraint arm is free to move with respect to the locking pin assembly.

20. The method of claim 14, wherein the slot includes a recess proximate a first end of the slot, wherein the locking pin has a large head and the locking pin assembly further includes a compression spring for providing a compression force, and wherein the restraint arm is locked with respect to the locking pin assembly when the compression.

21. The method of claim 20, further comprising the step of unlocking the restraint arm with respect to the locking pin assembly so that the locking pin is free to move relative to the slot, wherein the restraint arm is unlocked by compressing the compression spring so that the large head exits the recess.

* * * * *